United States Patent
Chhabra

(10) Patent No.: US 8,830,891 B2
(45) Date of Patent: *Sep. 9, 2014

(54) AD-HOC NETWORK POWER SAVE SYSTEM AND METHOD

(75) Inventor: Kapil Chhabra, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 13/619,595

(22) Filed: Sep. 14, 2012

(65) Prior Publication Data

US 2013/0010665 A1  Jan. 10, 2013

Related U.S. Application Data

(63) Continuation of application No. 11/855,082, filed on Sep. 13, 2007, now Pat. No. 8,315,193.

(60) Provisional application No. 60/825,611, filed on Sep. 14, 2006.

(51) Int. Cl.
*H04W 52/02* (2009.01)
*H04W 84/18* (2009.01)

(52) U.S. Cl.
CPC ................................. *H04W 84/18* (2013.01)
USPC ........................................................ 370/311

(58) Field of Classification Search
CPC . H04W 52/0219; H04W 52/02; H04W 84/18; H04W 52/0209
USPC .............. 370/310, 311; 455/73, 343.2, 426.2, 455/572, 574
See application file for complete search history.

(56) References Cited

U.S. PATENT DOCUMENTS

| 6,170,041 B1 | 1/2001 | LeVasseur et al. |
| 6,192,230 B1 * | 2/2001 | van Bokhorst et al. .... 455/343.3 |
| 6,804,542 B1 | 10/2004 | Haartsen |

(Continued)

FOREIGN PATENT DOCUMENTS

| EP | 1473951 A2 | 11/2004 |
| EP | 1589702 A1 | 10/2005 |

(Continued)

OTHER PUBLICATIONS

Office Action in corresponding Taiwanese Application No. 096134384, dated Apr. 29, 2013.

(Continued)

*Primary Examiner* — Chi Pham
*Assistant Examiner* — Robert Lopata

(57) ABSTRACT

Symmetrical and asymmetrical ad-hoc, wireless networks and a method for saving power in the same may include causing a first station to determine whether a second station has a master capability to buffer data traffic for the first station. A first station requests the second station to buffer the data traffic intended for the first station for a first predetermined period. The first station enters a first power save mode, and the second station buffers the data traffic for the first station for the first predetermined period. The first station exits the first power save mode after the first predetermined period and the second station sends the buffered data traffic to the first station. Both the first and second stations may have master capabilities, or only one of the first and second stations may have a master capability.

25 Claims, 12 Drawing Sheets

(56) References Cited

U.S. PATENT DOCUMENTS

| | | | |
|---|---|---|---|
| 6,842,460 B1 | 1/2005 | Olkkonen et al. | |
| 6,842,831 B2 | 1/2005 | Wilcox et al. | |
| 7,142,524 B2 | 11/2006 | Stanforth et al. | |
| RE40,032 E | 1/2008 | van Bokhorst et al. | |
| 7,436,789 B2 * | 10/2008 | Caliskan et al. | 370/310.1 |
| 7,542,437 B1 * | 6/2009 | Redi et al. | 370/311 |
| 7,564,810 B2 * | 7/2009 | Hernandez et al. | 370/311 |
| 7,660,578 B2 * | 2/2010 | Viitamaki et al. | 455/426.2 |
| 7,697,457 B2 * | 4/2010 | Igarashi et al. | 370/254 |
| 7,852,816 B2 * | 12/2010 | Jung | 370/338 |
| 8,068,460 B2 * | 11/2011 | Fajardo et al. | 370/331 |
| 8,315,193 B2 | 11/2012 | Chhabra | |
| 2003/0035464 A1 * | 2/2003 | Dehner et al. | 375/132 |
| 2004/0017824 A1 | 1/2004 | Koenck et al. | |
| 2004/0264396 A1 * | 12/2004 | Ginzburg et al. | 370/311 |
| 2005/0068934 A1 * | 3/2005 | Sakoda | 370/350 |
| 2005/0085279 A1 | 4/2005 | Aoki | |
| 2005/0136833 A1 | 6/2005 | Emeott et al. | |
| 2005/0213534 A1 | 9/2005 | Benveniste | |
| 2005/0237973 A1 | 10/2005 | Takeda et al. | |
| 2005/0237984 A1 | 10/2005 | Benveniste | |
| 2005/0282494 A1 | 12/2005 | Kossi et al. | |
| 2008/0056133 A1 * | 3/2008 | Deshpande et al. | 370/235 |
| 2009/0003295 A1 * | 1/2009 | Iwao et al. | 370/338 |
| 2009/0149127 A1 * | 6/2009 | Viitamaki et al. | 455/41.2 |

FOREIGN PATENT DOCUMENTS

| | | |
|---|---|---|
| EP | 1681806 A1 | 7/2006 |
| JP | 2004-336401 A | 11/2004 |
| JP | 2004-363702 A | 12/2004 |
| JP | 2005-130436 A | 5/2005 |
| JP | 2007-528641 A | 10/2007 |
| WO | WO-2005/064952 A1 | 7/2005 |

OTHER PUBLICATIONS

International Search Report in corresponding PCT/US07/19885 mailed Apr. 18, 2008.

Written Opinion in corresponding PCT/US07/19885 mailed Apr. 18, 2008.

Office Action in corresponding Chinese Application No. 2011052600602350 issued May 31, 2011.

Specification of the Bluetooth System, Version 2.0: vol. 0, "Master Table of Contents & Compliance Requirements," pp. 1-74; vol. 1, "Architecture & Terminology Overview," pp. 1-92; vol. 2, "Core System Package [Controller Volume]", pp. 1-814; vol. 4, "Core System Package [Host Volume]," pp. 1-250, Nov. 4, 2004.

International Preliminary Report on Patentability in corresponding PCT/US07/19885 mailed Mar. 17, 2009.

International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, (1999).

Pering, et al., "CoolSpots: Reducing the Power Consumption of Wireless Mobile Devices with Multiple Radio Interfaces," Fourth Intl Conf. on Mobile Systems, Applications, and Services, Uppsala, Sweden (MobiSys 2006) pp. 220-232 (2006).

"Notice of Reasons for Rejection" for Japanese Application No. 2009-528282 mailed Apr. 24, 2012.

Office Action in corresponding Japanese Application No. 2009-528282 mailed Apr. 24, 2012.

"Unapproved Draft Standard for Information Technology—Telecommunications and information exchange between systems—Local and metropolitan area network—Specific requirements Part 11: Wireless LAN Medium Access Control (MAC) and Physical Layer (PHY) specifications. (This document reflects the combining of the 2003 Edition of 802.11 plus the 802.11 g, 802.11 h, 802.11 i and 802.11j Amendments) (Revision of IEEE Std 802.11-1999)," IEEE Std P802.11-REVma/06.0, vol., no., 2006.

IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, (Jun. 12, 2007).

Search Report and Search Opinion for European Patent Application No. 07838142.3-1246, dated Aug. 22, 2012.

English translation of Korean Office Action for Korean Patent Application No. 10-2009-7007680, dated Nov. 28, 2013.

Office Action for corresponding European Patent Application No. 07 838 142.3 mailed May 9, 2014.

* cited by examiner

AD-HOC NETWORK POWER SAVE SYSTEM AND METHOD

CROSS-REFERENCE TO RELATED APPLICATIONS

The present application is a continuation of U.S. application Ser. No. 11/855,082, entitled "AD-HOC Network Power Save System and Method," filed on Sep. 13, 2007, now U.S. Pat. No. 8,315,193, which claims the benefit of U.S. Provisional Patent Application No. 60/825,611, filed Sep. 14, 2006. All of the above-referenced applications are hereby incorporated by reference herein in their entireties.

FIELD OF THE DISCLOSURE

The invention relates generally to a power save system in a network and, more particularly to a periodic power save system in an ad-hoc wireless network.

BACKGROUND

A wireless network (e.g., Wi-Fi based on IEEE 802.11 standards) may be characterized as an infrastructure mode network or an ad-hoc mode network depending on whether the stations within the wireless network can directly communicate with other stations in the network. FIG. 1(A) illustrates an example of an infrastructure mode wireless network, which may typically comprise an access point 2 and stations 4, 6 and 8. In the infrastructure mode network, the stations 4, 6 and 8 are not configured to directly communicate with each other, and any communication between the stations 4, 6 and 8 must be channeled through the access point 2.

In contrast, an ad-hoc mode network allows each station to communicate directly with each other, as illustrated in FIG. 1(B). Thus, in the ad-hoc mode wireless network, there is no central access point controlling communication among the stations 4, 6 and 8. Ad-hoc devices are configured to communicate only with other ad-hoc devices, and they are not able to communicate with any infrastructure devices or any other devices connected to a wired network.

Considering that a significant portion of the Wi-Fi devices are portable devices (e.g., cellular phones, portable gaming devices, wireless headsets, wireless headphones, wireless speakers and the like), power consumption has become an important issue for the Wi-Fi devices. This has led the IEEE to standardize the infrastructure mode network power save protocol. However, due to the decentralized nature of ad-hoc mode networks, it is much more difficult and complicated to implement power save algorithms when there is no central access point that dictates all the decisions related to power consumption in the network.

SUMMARY OF THE DISCLOSURE

The invention allows ad-hoc network devices to enter a power save mode. The invention also provides for power consumption decisions to be made in an ad-hoc network to improve implementation of power save algorithms. Other advantages and benefits of the invention are apparent from the discussion herein.

Accordingly, in one aspect of the invention, a method for saving power in an ad-hoc network including first and second stations each having a wireless capability to directly communicate with each other includes issuing a request to the second station to buffer data traffic intended for the first station for a first predetermined period, granting the request to buffer data traffic, causing the first station to enter a first power save mode for the first predetermined period, and enabling the second station to buffer data traffic intended for the first station for the first predetermined period.

The method may further include causing the first station to exit the first power save mode after the first predetermined period elapses, and sending the buffered data traffic to the first station. Sending the buffered data traffic may include sending the buffered data traffic from the second station to the first station. The method may further include causing the first and second stations to simultaneously enter a second power save mode for a second period time. The method may further include advertising a master capability of the second station to buffer data traffic intended for the first station. The method may further include causing the second station to exit the second power save mode before the first station exits the second power save mode. The ad-hoc network may be a wireless network using protocol selected from the group consisting of IEEE 802.11 standards and Bluetooth standards. The method may further include determining whether the second station has a capability to buffer data traffic intended for the first station. The method may further include issuing a request to the first station to buffer data traffic intended for the second station for a second predetermined period, granting the request to buffer data traffic intended for the second station, causing the second station to enter a second power save mode for the second predetermined period, and enabling the first station to buffer the data traffic intended for the second station for the second predetermined period. The method may further include causing the second station to exit the second power save mode after the second predetermined period elapses, and sending the buffered data traffic to the second station. Sending the buffered data traffic to the second station may include sending the buffered data traffic from the first station to the second station. The method may further include determining whether the first station has a capability to buffer data traffic intended for the second station. The method may further include preventing the first station from entering the first power save mode if the second station requests the first station to buffer the data traffic intended for the second station, and preventing the second station from entering the second power save mode if the first station requests the second station to buffer the data traffic intended for the first station. The method may further include preventing the first station from entering the first power save mode occurs if the request is received within a predetermined period of time from when the first station sends such a request, and preventing the second station from entering the second power save mode occurs if the request is received within a predetermined period of time from when the second station sends such a request. The method may further include causing the slave station to exit the power save mode after the predetermined period elapses, and causing the master station to send the buffered data traffic to the slave station. The method may further include advertising a master capability of the master station to buffer data traffic intended for any of the plurality of stations in the ad-hoc network, and determining if the master station has the master capability to buffer data traffic intended for one of the plurality of stations. The ad-hoc network may be a wireless network using a protocol selected from the group consisting of IEEE 802.11 standards and Bluetooth standards.

According to another aspect of the invention, a method for saving power in an ad-hoc network including a plurality of stations, the plurality of stations including a master station and at least one slave station incapable of buffering traffic for other stations, each station having a wireless capability to directly communicate with other stations, includes issuing a request to the master station to buffer data traffic intended for the slave station for a predetermined period, granting the request to buffer data traffic, causing the slave station to enter a power save mode for the predetermined period, and enabling the master station to buffer data traffic intended for the slave station for the predetermined period.

The first station has a master capability to buffer data traffic intended for other stations in the ad-hoc network for a second predetermined period and may be configured to grant a request from the second station to allow the second station to enter a second power save mode, and wherein the second station may be configured to determine if there may be any station having the master capability in the ad-hoc network. The second station may enter the second power save mode for the second predetermined period when the first station grants the request from the second station, and the first station sends the buffered data traffic to the second station after the second predetermined period elapses. The first station may be configured not to enter the first power save mode if the second station requests the first station to buffer the data traffic intended for the second station, and the second station may be configured not to enter the second power save mode if the first station requests the second station to buffer the data traffic intended for the first station. The first station may not enter the first power save mode if the request is received within a predetermined period of time from when the first station sends such a request, and wherein the second station may not enter the first power save mode if the request is received within a predetermined period of time from when the second station sends such a request. The master and slave stations may be configured to simultaneously enter a second power save mode for a second period time. The master station may be configured to exit the second power save mode before the slave station exits the second power save mode. The ad-hoc network may be a wireless network using a protocol selected from the group consisting of IEEE 802.11 standards and Bluetooth standards.

In yet another aspect of the invention, an ad-hoc network includes a first station having wireless communication capabilities and configured to determine if there is any station in the ad-hoc network having a master capability to buffer data traffic intended for other stations in the ad-hoc network for a first predetermined period, the second station having wireless communication capabilities and the master capability and configured to grant a request from said first station to allow said first station to enter a first power save mode, and wherein the first station enters the first power save mode for the first predetermined period when the second station grants the request and the second station sends the buffered data traffic to the first station after the first predetermined period elapses A system for saving power in an ad-hoc network including first and second stations each having a wireless capability to directly communicate with each other, the system further includes means for issuing a request to the second station to buffer data traffic intended for the first station for a first predetermined period, means for granting the request to buffer data traffic, means for causing the first station to enter a first power save mode for the first predetermined period, and means for enabling the second station to buffer data traffic intended for the first station for the first predetermined period.

A machine-readable medium including stored instructions, which, when executed by a processor cause the processor to implement power saving in an ad-hoc network having a plurality of stations, the instructions including instructions for determining whether a first one of the stations has a capability to buffer data traffic intended for a second station, instructions for requesting the at least one station to buffer data traffic intended for the second station for a first predetermined period, instructions for granting a request to buffer data traffic intended for the second station, instructions for causing the second station to enter a first power save mode for the first predetermined period, and instructions for enabling the first one station to buffer data traffic intended for the second station for a second predetermined period, instructions for causing the second station to exit the first power save mode after the first predetermined period elapses, and instructions for sending the buffered data traffic to the second station.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and the various ways in which it may be practiced. In the drawings.

DETAILED DESCRIPTION

Figure 1A:
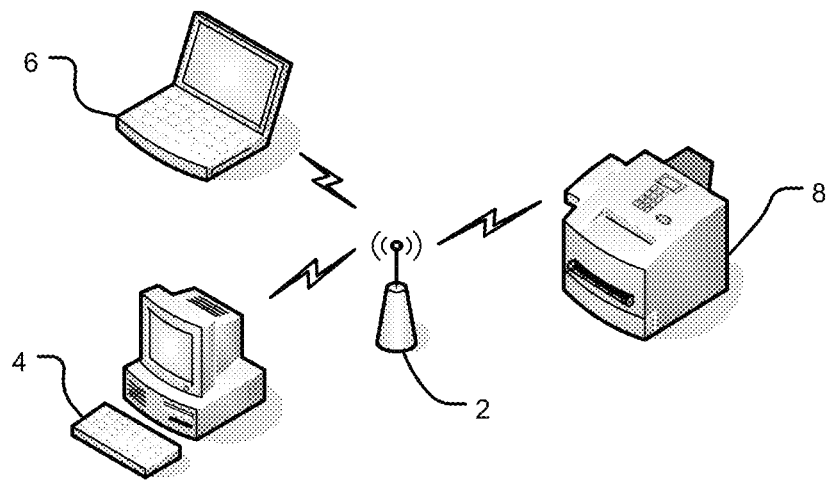
FIGS. 1(A) and 1(B) illustrate an example of an infrastructure mode network and ad-hoc mode network, respectively.
Figure 1B:
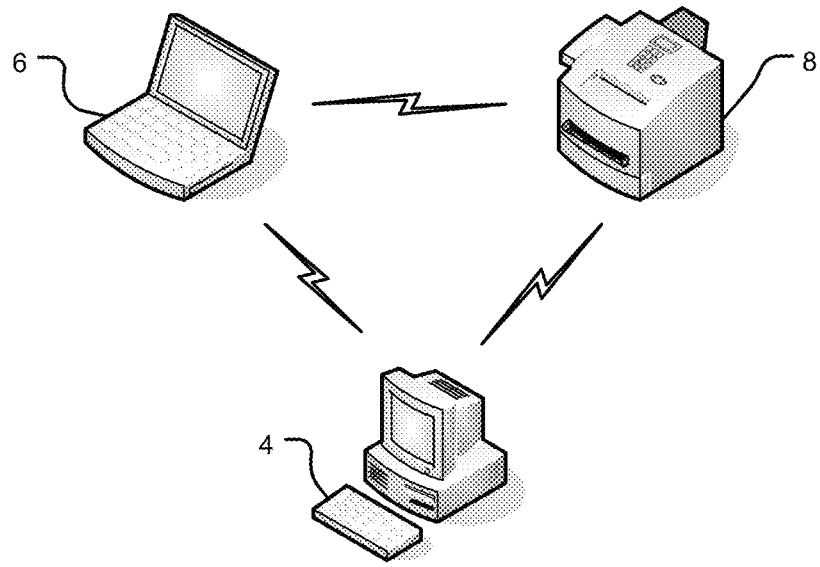

The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. For example, the invention is described in terms of Wi-Fi network based on IEEE 802.11 standard, but it will be understood that the invention is not so limited. The invention may be broadly applicable to any ad-hoc mode wireless network and other types of wireless networks that have appropriate features and characteristics. Accordingly, the examples and embodiments herein should not be construed as limiting the scope of the invention, which is defined solely by the appended claims and applicable law. Moreover, it is noted that like reference numerals represent similar parts throughout the several views of the drawings.

The invention relates to periodic power save protocols for ad-hoc networks. Different devices within the ad-hoc network can take on the role of a master while the other slave devices enter a power save mode. The master device receives data for the other devices and sends the buffered data when those slave devices wake up. This protocol allows for power savings among the devices. Various aspects of the invention will now be described in greater detail below.

Figure 2A:
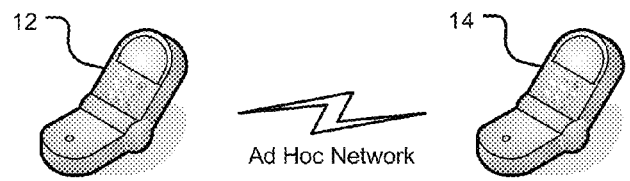
FIGS. 2(A) and 2(B) illustrate examples of a symmetrical ad-hoc network.
Figure 2B:

FIGS. 2(A), 2(B), 3(A), 3(B) and 3(C) illustrate examples of an ad-hoc mode network configuration. Depending on similarity of capabilities among the devices (i.e., stations, nodes or the like) in the network, the ad-hoc mode network may be characterized as a symmetrical ad-hoc mode network or an asymmetrical ad-hoc mode network. FIGS. 2(A) and 2(B) illustrate examples of the symmetrical ad-hoc mode network, in which the devices may have similar capabilities, such as, for example, processing power, memory, battery life or the like. In particular, FIG. 2(A) illustrates two walkie-talkies or cellular phones 12 and 14 with identical or substantially the same capabilities connected via an ad-hoc mode network. This connection allows real-time multi-user voice communication via the ad-hoc mode network. When the devices 12 and 14 are not in use, it may be necessary to turn off one or both devices to save power. Since there is no central access point to carry out a power save mode, a power save protocol may be carried out on all devices in the network without overburdening any particular device. For example, each of the devices 12 and 14 may alternatively take charge by acting as a master device that carries out power save algorithms in the network.

Similarly, FIG. 2(B) illustrates two identical portable gaming devices 16 and 18 (e.g., Sony™ PSP™ or the like) connected to each other via an ad-hoc mode network. This connection may provide real-time multi-player gaming experiences for those using the portable gaming devices 16 and 18. When the devices 16 and 18 are not being used, the devices 16 and 18 may communicate with each other to decide which device will take charge as a "master" to carry out a power save protocol for the network. The "master" device may allow other devices (i.e., slaves) in the network to enter a power save mode and buffer data traffic for the slave devices, which will be also described below in detail. It should be understood that walkie-talkies, cell phones and gaming devices are merely illustrative of the type of devices that may be connected in a symmetrical, ad-hoc network.

Figure 3A:
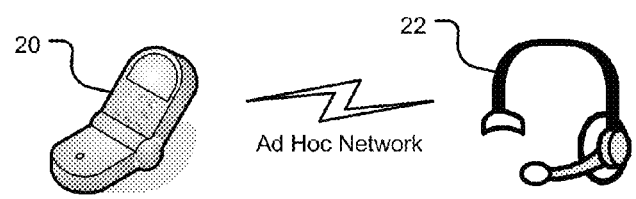
FIGS. 3(A), 3(B) and 3(C) illustrate examples of a asymmetrical ad-hoc network.
Figure 3B:
Figure 3C:
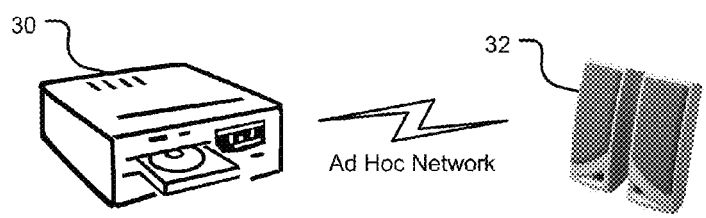

FIGS. 3(A), 3(B) and 3(B) illustrate examples of the asymmetrical ad-hoc mode network configuration, in which the ad-hoc devices have different capabilities. For example, FIG. 3(A) illustrates an asymmetrical ad-hoc mode network including a cellular phone 20 and a wireless headset 22. Typically, the wireless headset 22 is provided with significantly less capabilities than the cellular phone 20 and may not be able to carry out the power save algorithms for the ad-hoc network. In this case, the power save protocol may exploit the capabilities of the cellular phone 20, which may permanently take charge as a master while the headset 22 permanently operates as a slave in this situation. Similarly, FIG. 3(B) illustrates a PC 24 and a wireless headphone 26 connected to each other via an ad-hoc mod network, wherein the PC 24 operates as the master while the wireless headphone 26 operates as the slave in carrying out the power save mode. In FIG. 3(C), an audio device 30 with more capabilities may carry out the power save mode as a permanent master to wireless speakers 32. Again, these examples are merely illustrative of the type of devices that may be connected in an asymmetrical, ad-hoc network.

Figure 4A:
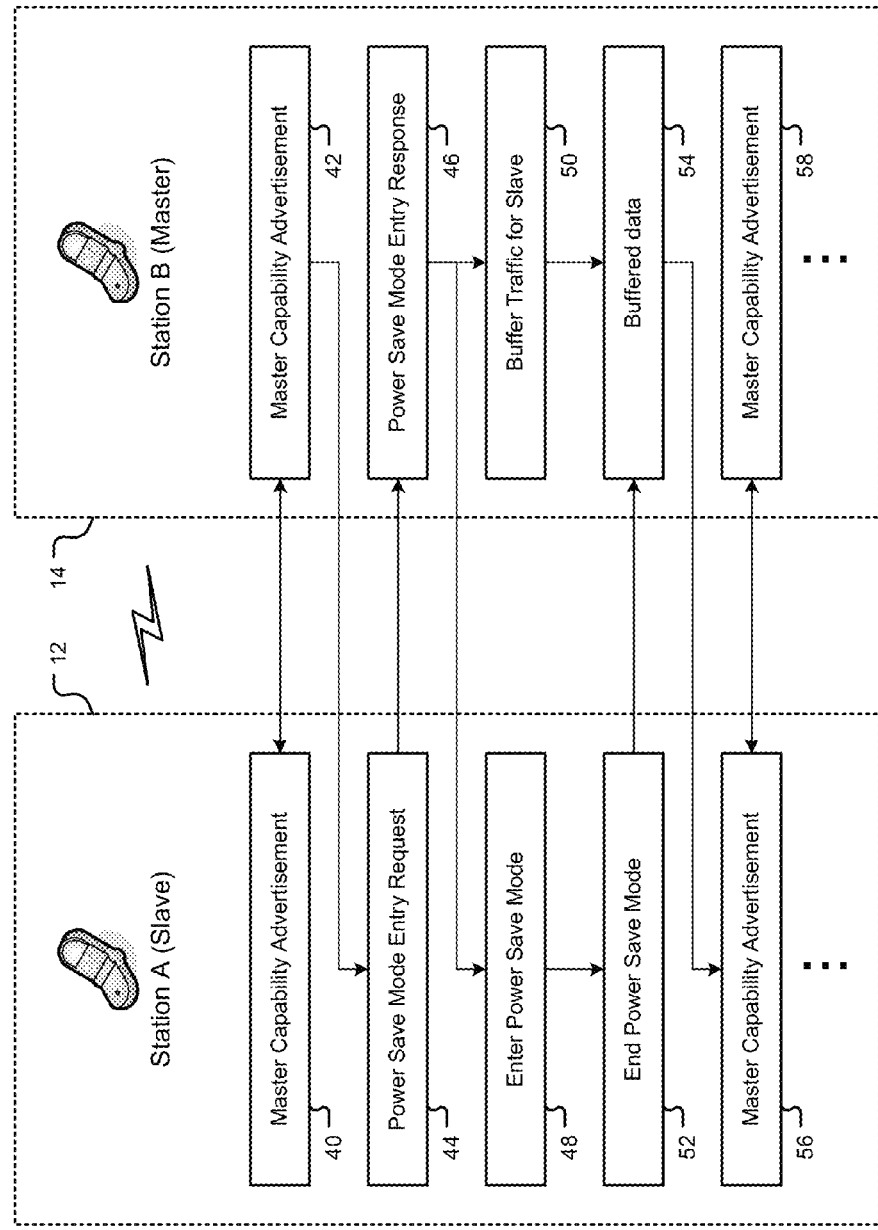
FIG. 4(A) is a flow chart for a power save scheme in a symmetrical ad-hoc network constructed according to the principles of the invention.

FIG. 4(A) illustrates a flow chart for a power save scheme in a symmetrical ad-hoc network constructed according to the principles of the invention. As mentioned above, in a symmetrical ad-hoc mode network, each device may have capabilities to carry out power save algorithms in the network as a master. Thus, it is assumed that stations A and B (e.g., walkie-talkies 12 and 14 in FIG. 2(A), respectively) are both equally capable of carrying out the power save algorithms without overburdening the other one. As shown in steps 40 and 42, stations 12 and 14 both advertise their master capabilities to other stations in the network. The master capabilities may include an ability to buffer data designated for other stations in the network that are in a sleep (power save) mode. After confirming that station B has master capabilities, station A may send a power save enter request to station B, as shown in step 44. The power save enter request may be included in an uplink IEEE action management frame of station A's beacon that is sent to station B. The frame may include information about the sleep period of station A. The power save enter request may be included in an uplink IEEE action management frame sent from slave to master. The capability to implement this protocol may be advertised in the station beacons and probe responses. The power save enter request/response may be sent using IEEE Action Management frames. Further, the power save enter request may include information about the slave station's frequency of wake-ups (referred to as sleep period), while the power save enter response may include information about a number of service periods the master may buffer traffic for slave.

It is possible that both stations A and B send their respective power save enter requests to each other. To avoid the conflict, each station may be configured to stay in a full power mode when the request is received from other stations. Each station may then compute a random back-off and re-attempt to enter the power save mode when the back-off expires or stay in full power mode as the master if other station's back-off expires earlier.

Upon accepting the request from station A, station B becomes the master and station A becomes the slave. As shown in step 46, station B may send a power save enter response to station A. The power save enter response may be included in an IEEE action management frame. The power save enter response may contain the maximum number of service periods during which the master station B will buffer data traffic for slave station A. According to an embodiment of the invention, a service period may be defined as the period between receiving an uplink trigger from slave station A to the point where master station B sends an end of service period (EOSP) indication. Each uplink frame with a trigger bit set from slave station A may be counted as one service period by master station B. For Wi-Fi multi-media (WMM) applications, for example, the WMM EOSP bit in the quality of service (QOS) information field may be used as the trigger bit by slave station in the uplink direction. For non-WMM applications, for example, the "more-data" bit in the IEEE 802.11 frame control field may be used as the trigger bit.

In step 46, after receiving the power save enter response from master station B, slave station A may enter power save mode as shown in step 48. Master station B may start buffering data traffic for slave station A, as shown in step 50. While in the power save mode, slave station A may not beacon and advertise its capability as a master. Every time slave station A wakes up, it may send an uplink trigger frame to master station B with the trigger bit "set." Slave station A may send exactly one trigger frame in every wake-up period. If slave station A has more than one frame in every wake-up period, slave station A may transmit subsequent frames with trigger bit "unset." If slave station A has no uplink data to send, it may send a "null" uplink trigger frame with trigger bit set. Also, all uplink frames from slave station A may have the power management bit set to "1" in the IEEE 802.11 frame control field. Master station B, in turn, may respond to the trigger frame with downlink data buffered for slave station A. The last downlink frame from master station B may the EOSP bit set. For WMM applications, the WMM EOSP bit in the QOS information field may be used by master station B in the downlink direction to mark EOSP. For non-WMM applications, the "more-data" bit in the IEEE 802.11 frame control field may be used as the EOSP indication. If no downlink data has been buffered for slave station A, master station B may send a null data frame with the EOSP bit set. Also, in one example, the system may be configured so that the uplink frames sent from slave station A with the trigger bit unset may not cause master station B to empty a power save queue for the respective slave station.

After the maximum number of service periods permitted by master station B is reached, master station B may stop buffering data traffic for slave station A. Slave station A may end power save mode in step 52. The data is buffered by master station B and forwarded to slave station A in step 54. Slave station A and master station B may enter the full power mode by resuming beaconing and advertising their capability as a master station, as shown in steps 56 and 58. Both stations A and B then may compute a random back-off and attempt to become slaves on back-off expiry. The steps shown in FIG. 4(A) may be repeated. Since each station may rotate through the role of a slave or master, power consumption issues on all stations in the network may be greatly improved without overburdening a particular station. For example, assuming that each station spends equal time in the master and slave roles, the power save protocol may reduce the power consumption for the slave stations up to about 75%. Further, the protocol may reduce the power consumption for both master and slave stations up to about 38% compared to the full power mode. The power saving may increase as the number of slave stations increases.

Figure 4B:
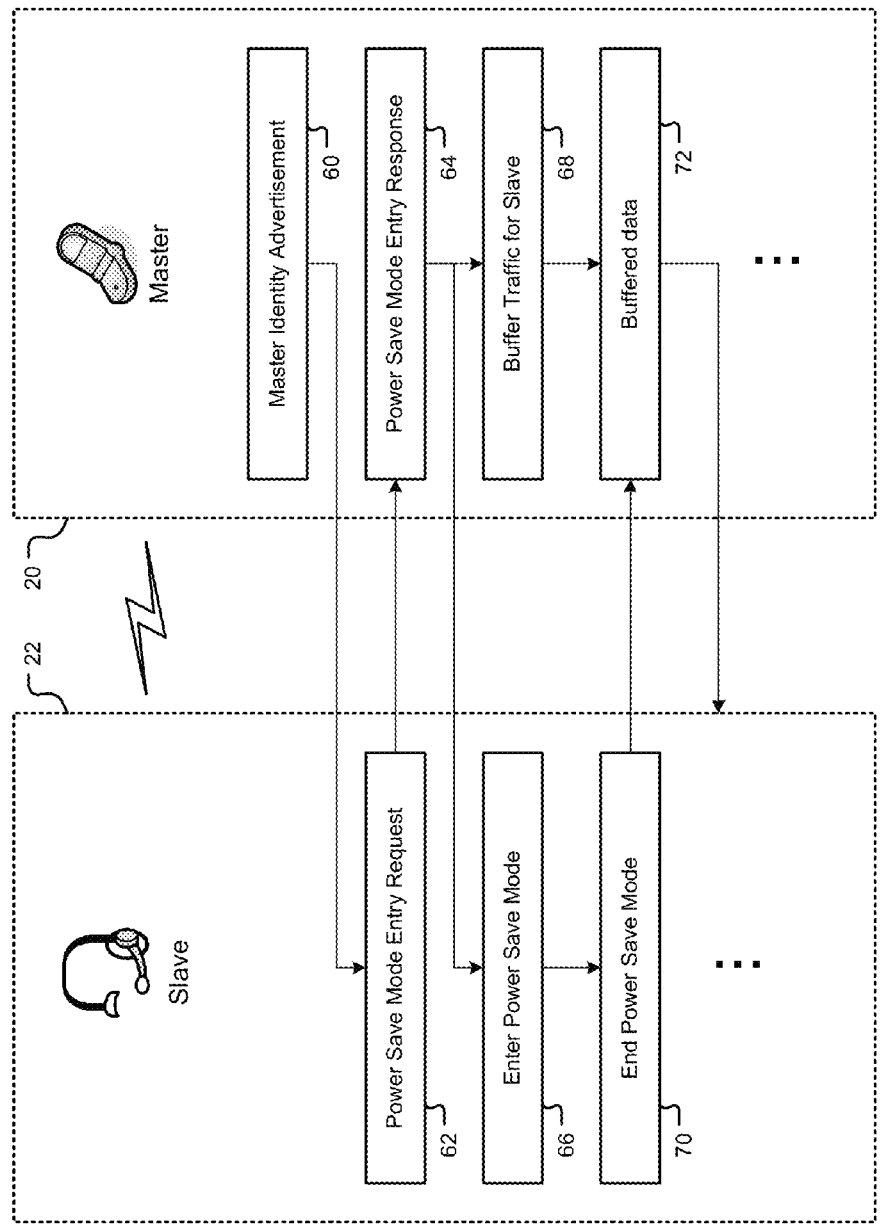
FIG. 4(B) is a flow chart for a power save scheme in an asymmetrical ad-hoc network constructed according to the principles of the invention.

FIG. 4(B) illustrates a flow chart for a power save scheme in an asymmetrical ad-hoc network constructed according to the principles of the invention. For example, the asymmetrical ad-hoc network may include the cellular phone 20 as the master and the wireless headset 22 illustrated in FIG. 3(A). As mentioned above, in the asymmetrical ad-hoc network, only one station may have the master capabilities. Thus, step 60 of advertising the master capabilities and the master/slave power save enter request/response steps 62 and 64 (i.e., master/slave handshake) are implemented. For example, the master station may return 0xFFFF in the maximum service period field as the "master indefinite" indication. Some implementations with pre-provisioned master/slave configurations may bypass the master/slave handshake among the stations as their roles may have been already decided at the production stage. Other than those differences, the power save protocol illustrated in FIG. 4(B) may perform steps similar to the steps performed for the symmetrical ad-hoc power save mode shown in FIG. 4(A). For example, after executing the master/slave handshake shown in steps 62 and 64, the slave station 22 may enter the power save mode at step 66 while the master station 20 may buffer the data traffic for the slave station 22 at step 68. When the slave station 22 wakes up from the power save mode at step 70, the master station 20 may send the buffered data traffic to the slave station 20 at step 72. If the slave station 22 is not frequently used, power save may be greatly increased by allowing the slave station 22 to enter the power save mode.

In order to further improve power saving, the master station 20 may use the sleep period of the slave station 22 to enter the power save mode after sending a downlink frame with the EOSP bit set. For example, upon receiving an uplink frame from the slave station 22 with the trigger bit set, the master station 20 may start a sleep clock timer with a timeout set to expire at a certain point before the slave station 22 wakes up. The sleep clock timer may include an offset that may account for any timing errors in the sleep clock to ensure the master station 20 wakes up before the next slave wakeup. The master station 20 may exchange data with the EOSP bit set in the last downlink frame to the slave station 22. After sending the frame with the EOSP bit set, the master and slave stations both may enter the power save mode. The slave station 22 may be required not to transmit any frames after receiving the downlink with the EOSP bit set. In this case, if both the master and slave stations have 75% power savings in the power save mode, the overall system may be able to save power up to 75%.

Figure 5:
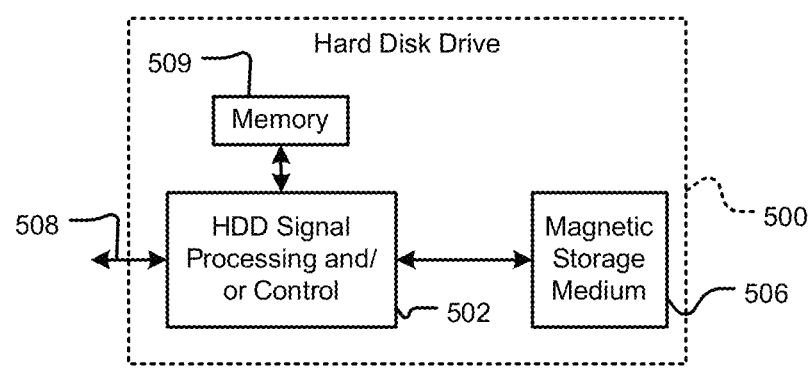
FIGS. 5-12 show various exemplary implementations of the invention.

Referring now to FIGS. 5, 6, 7, 8, 9, 10, 11 and 12, various exemplary applications of the invention are shown. Referring to FIG. 5, the invention may be embodied in a hard disk drive 500. The invention may implement either or both signal processing and/or control circuits, which are generally identified in FIG. 5 at 502. In some implementations, signal processing and/or control circuit 502 and/or other circuits (not shown) in HDD 500 may process data, perform coding and/or encryption, perform calculations, and/or format data that is output to and/or received from a magnetic storage medium 506.

HDD 500 may communicate with a host device (not shown) such as a computer, mobile computing devices such as personal digital assistants, cellular phones, media or MP3 players and the like, and/or other devices via one or more wired or wireless communication links 508. HDD 500 may be connected to memory 509, such as random access memory (RAM), a low latency nonvolatile memory such as flash memory, read only memory (ROM) and/or other suitable electronic data storage.

Figure 6:
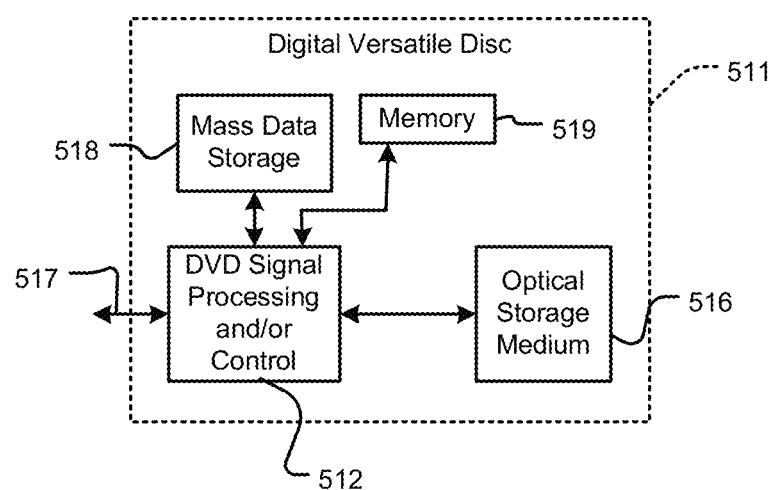

Referring first to FIG. 6, the invention may be embodied in a digital versatile disc (DVD) drive 511. The invention may implement either or both signal processing and/or control circuits, which are generally identified in FIG. 6 at 512, and/or mass data storage 518 of the DVD drive 511. Signal processing and/or control circuit 513 and/or other circuits (not shown) in the DVD 511 may process data, perform coding and/or encryption, perform calculations, and/or format data that is read from and/or data written to an optical storage medium 516. In some implementations, signal processing and/or control circuit 512 and/or other circuits (not shown) in DVD 511 can also perform other functions such as encoding and/or decoding and/or any other signal processing functions associated with a DVD drive.

DVD drive 511 may communicate with an output device (not shown) such as a computer, television or other device via one or more wired or wireless communication links 517. DVD 511 may communicate with mass data storage 518 that stores data in a nonvolatile manner. DVD 511 may be connected to memory 519, such as RAM, ROM, low latency nonvolatile memory such as flash memory, and/or other suitable electronic data storage.

Figure 7:
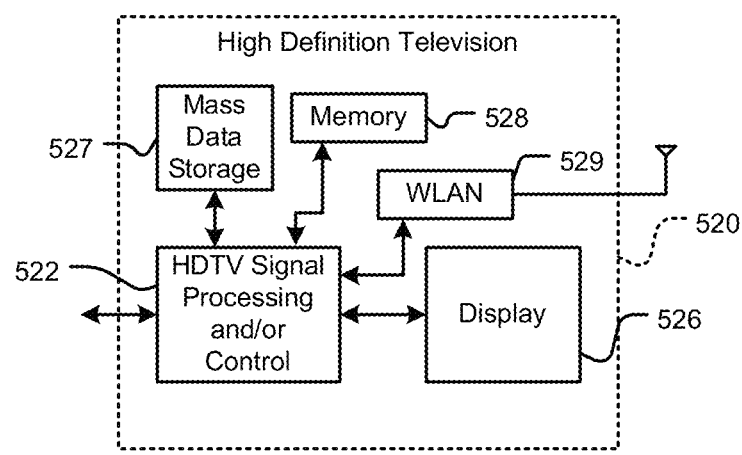

Referring now to FIG. 7, the invention may be embodied in a high definition television (HDTV) 520. The invention may implement either or both signal processing and/or control circuits, which are generally identified in FIG. 7 at 522, a WLAN interface and/or mass data storage of the HDTV 520. HDTV 520 receives HDTV input signals in either a wired or wireless format and generates HDTV output signals for a display 526. In some implementations, the signal processing circuit and/or control circuit 522 and/or other circuits (not shown) of HDTV 520 may process data, perform coding and/or encryption, perform calculations, format data and/or perform any other type of HDTV processing that may be required.

HDTV 520 may communicate with a mass data storage 527 that stores data in a nonvolatile manner such as optical and/or magnetic storage devices. At least one DVD may have the configuration shown in FIG. 6. HDTV 520 may be connected to a memory 528 such as RAM, ROM, low latency nonvolatile memory such as flash memory and/or other suitable electronic data storage. HDTV 520 also may support connections with a WLAN via a WLAN network interface 529.

Figure 8:
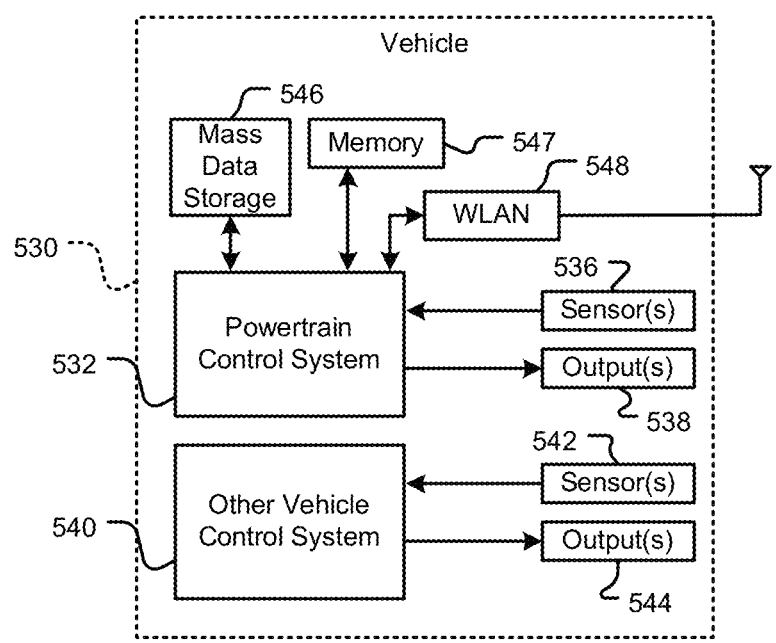

Referring now to FIG. 8, the invention may be implemented in a control system of a vehicle 530, a WLAN interface and/or mass data storage of the vehicle control system. In some implementations, the invention implements a powertrain control system 532 that receives inputs from one or more sensors 536 such as temperature sensors, pressure sensors, rotational sensors, airflow sensors and/or any other suitable sensors and/or that generates one or more output control signals from an output 538 such as engine operating parameters, transmission operating parameters, and/or other control signals.

The invention may also be embodied in other control systems 540 of vehicle 530. Control system 540 may likewise receive signals from input sensors 542 and/or output control signals to one or more output devices 544. In some implementations, control system 540 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

Powertrain control system 532 may communicate with mass data storage 546 that stores data in a nonvolatile manner. Mass data storage 546 may include optical and/or magnetic storage devices for example hard disk drives HDD and/or DVDs. At least one DVD may have the configuration shown in FIG. 6. Powertrain control system 532 may be connected to memory 547 such as RAM, ROM, low latency nonvolatile memory such as flash memory and/or other suitable electronic data storage. Powertrain control system 532 also may support connections with a WLAN via a WLAN network interface 548. The control system 540 may also include mass data storage, memory and/or a WLAN interface (all not shown).

Figure 9:
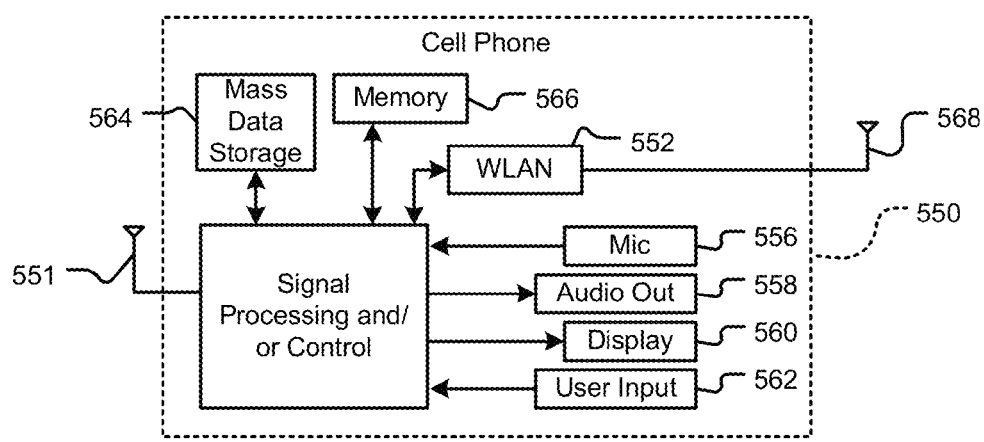

Referring now to FIG. 9, the invention may be embodied in a cellular phone 550 that may include a cellular antenna 551. The invention may implement either or both signal processing and/or control circuits, which are generally identified in FIG. 9 at 552, a WLAN interface and/or mass data storage of the cellular phone 550. In some implementations, cellular phone 550 includes a microphone 556, an audio output 558 such as a speaker and/or audio output jack, a display 560 and/or an input device 562 such as a keypad, pointing device, voice actuation and/or other input device. Signal processing and/or control circuits 552 and/or other circuits (not shown) in cellular phone 550 may process data, perform coding and/or encryption, perform calculations, format data and/or perform other cellular phone functions.

Cellular phone 550 may communicate with a mass data storage 564 that stores data in a nonvolatile manner such as optical and/or magnetic storage devices for example hard disk drives HDD and/or DVDs. At least one DVD may have the configuration shown in FIG. 6. Cellular phone 550 may be connected to a memory 566 such as RAM, ROM, low latency nonvolatile memory such as flash memory and/or other suitable electronic data storage. Cellular phone 550 also may support connections with a WLAN via a WLAN network interface 568.

Figure 10:
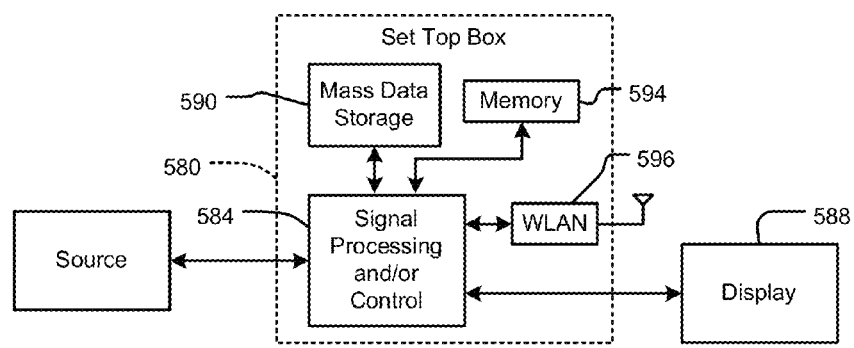

Referring now to FIG. 10, the invention may be embodied in a set top box 580. The invention may implement either or both signal processing and/or control circuits, which are generally identified in FIG. 10 at 584, a WLAN interface and/or mass data storage of the set top box 580. Set top box 580 receives signals from a source such as a broadband source and outputs standard and/or high definition audio/video signals suitable for a display 588 such as a television and/or monitor and/or other video and/or audio output devices. Signal processing and/or control circuits 584 and/or other circuits (not shown) of the set top box 580 may process data, perform coding and/or encryption, perform calculations, format data and/or perform any other set top box function.

Set top box 580 may communicate with mass data storage 590 that stores data in a nonvolatile manner. Mass data storage 590 may include optical and/or magnetic storage devices for example hard disk drives HDD and/or DVDs. At least one DVD may have the configuration shown in FIG. 6. Set top box 580 may be connected to memory 594 such as RAM, ROM, low latency nonvolatile memory such as flash memory and/or other suitable electronic data storage. Set top box 580 also may support connections with a WLAN via a WLAN network interface 596.

Figure 11:
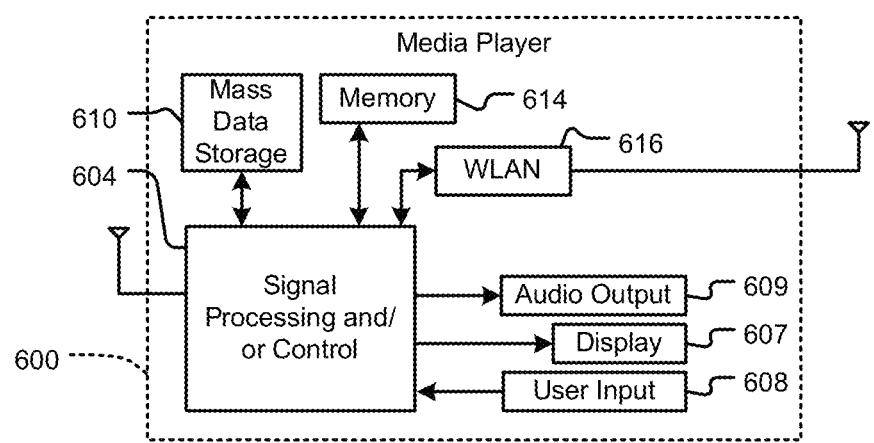

Referring now to FIG. 11, the invention may be embodied in a media player 600. The invention may implement either or both signal processing and/or control circuits, which are generally identified in FIG. 11 at 604, a WLAN interface and/or mass data storage of the media player 600. In some implementations, media player 600 includes a display 607 and/or a user input 608 such as a keypad, touchpad and the like. In some implementations, media player 600 may employ a graphical user interface (GUI) that typically employs menus, drop down menus, icons and/or a point-and-click interface via display 607 and/or user input 608. Media player 600 further includes an audio output 609 such as a speaker and/or audio output jack. Signal processing and/or control circuits 604 and/or other circuits (not shown) of media player 600 may process data, perform coding and/or encryption, perform calculations, format data and/or perform any other media player function.

Media player 600 may communicate with mass data storage 610 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one DVD may have the configuration shown in FIG. 6. Media player 600 may be connected to memory 614 such as RAM, ROM, low latency nonvolatile memory such as flash memory and/or other suitable electronic data storage. Media player 600 also may support connections with a WLAN via a WLAN network interface 616.

Figure 12:
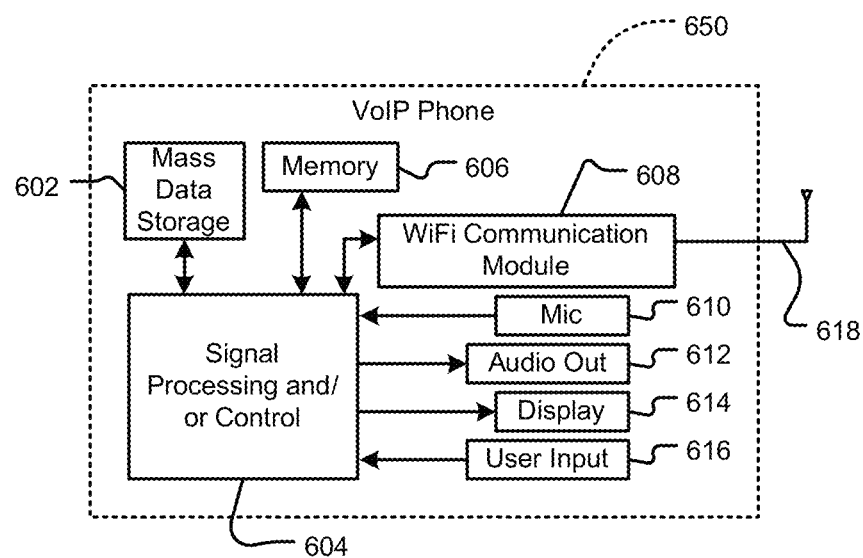

Referring to FIG. 12, the invention may be embodied in a Voice over Internet Protocol (VoIP) phone 650 that may include an antenna 618. The invention may implement either or both signal processing and/or control circuits, which are generally identified in FIG. 12 at 604, a wireless interface and/or mass data storage of the VoIP phone 650. In some implementations, the VoIP phone 650 includes, in part, a microphone 610, an audio output 612 such as a speaker and/or audio output jack, a display monitor 614, an input device 616 such as a keypad, pointing device, voice actuation and/or other input devices, and a Wireless Fidelity (Wi-Fi) communication module 608. Signal processing and/or control circuits 604 and/or other circuits (not shown) in VoIP phone 650 may process data, perform coding and/or encryption, perform calculations, format data and/or perform other VoIP phone functions.

VoIP phone 650 may communicate with mass data storage 602 that stores data in a nonvolatile manner such as optical and/or magnetic storage devices, for example hard disk drives HDD and/or DVDs. At least one DVD may have the configuration shown in FIG. 6. The VoIP phone 650 may be connected to memory 606, which may be a RAM, ROM, low latency nonvolatile memory such as flash memory and/or other suitable electronic data storage. The VoIP phone 650 may be configured to establish communications link with a VoIP network (not shown) via Wi-Fi communication module 608. Still other implementations in addition to those described above are contemplated.

In accordance with various embodiments of the invention, the methods described herein are intended for operation with dedicated hardware implementations including, but not limited to, semiconductors, application specific integrated circuits, programmable logic arrays, and other hardware devices constructed to implement the methods and modules described herein. Moreover, various embodiments of the invention described herein are intended for operation with as software programs running on a computer processor. Furthermore, alternative software implementations including, but not limited to, distributed processing or component/object distributed processing, parallel processing, virtual machine processing, any future enhancements, or any future protocol can also be used to implement the methods described herein.

It should also be noted that the software implementations of the invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

While the invention has been described in terms of exemplary embodiments, those skilled in the art will recognize that the invention can be practiced with modifications in the spirit and scope of the appended claims. By way of example, the stations of the inventions may be any device capable of wireless communication and standards other than the IEEE 802.11 standard may be used to implement the invention, such as Bluetooth and similar standards. These examples given above are merely illustrative and are not meant to be an exhaustive list of all possible designs, embodiments, applications or modifications of the invention.

What is claimed is:

1. A method for saving power in an ad-hoc network including a first station and a second station, wherein each of the first station and the second station has a corresponding network interface configured to wirelessly communicate with other stations in the ad-hoc network, the method comprising:
   transmitting, from the first station, an advertisement of a capability of the first station to buffer data traffic intended for other stations in the ad-hoc network;
   responsive to transmitting the advertisement of the capability of the first station to buffer data traffic intended for other stations in the ad-hoc network,
      receiving, at the first station, a request to buffer data traffic intended for the second station for a time period; and
   responsive to receiving the request at the first station,
      transmitting, from the first station, a response to the request, wherein the response acknowledges acceptance of the request,
      buffering, at the first station, data traffic intended for the second station, and
      subsequent to buffering the data traffic intended for the second station, transmitting, from the first station to the second station, the buffered data traffic intended for the second station.

2. The method of claim 1, further comprising responsive to receiving the request to buffer data traffic intended for the second station, preventing the first station from entering a power save mode.

3. The method of claim 1, wherein the time period corresponds to a length of time during which the second station will enter a first power save mode.

4. The method of claim 3, further comprising causing the first station to enter a second power save mode when the second station enters the first power save mode.

5. The method of claim 4, further comprising causing the first station to exit the second power save mode before the second station exits the first power save mode.

6. The method of claim 1, wherein the response includes an indication of a time length for which the first station will buffer data traffic for the second station.

7. The method of claim 1, wherein the ad-hoc network is a wireless network using a protocol selected from the group consisting of IEEE 802.11 standards and Bluetooth standards.

8. A first station for use in an ad-hoc network, the first station comprising:
   a network interface, wherein the network interface is configured to:
      transmit an advertisement of a capability of the first station to buffer data traffic intended for other stations in the ad-hoc network,
      responsive to transmitting the advertisement of the capability of the first station to buffer data traffic intended for other stations in the ad-hoc network,
         receive a request to buffer data traffic intended for a second station for a time period; and
      responsive to receiving the request at the first station,
         transmit a response to the request, wherein the response acknowledges acceptance of the request,
         buffer data traffic intended for the second station, and
         subsequent to buffering the data traffic intended for the second station, transmit the buffered data traffic intended for the second station.

9. The first station of claim 8, wherein the network interface is further configured to, responsive to receiving the request to buffer data traffic intended for the second station, prevent the first station from entering a power save mode.

10. The method of claim 8, wherein the time period corresponds to a length of time during which the second station enters a first power save mode.

11. The first station of claim 10, wherein the network interface is further configured to cause the first station to enter a second power save mode when the second station enters the first power save mode.

12. The first station of claim 11, wherein the network interface is further configured to cause the first station to exit the second power save mode before the second station exits the first power save mode.

13. The first station of claim 8, wherein the ad-hoc network is a wireless network using protocol selected from the group consisting of IEEE 802.11 standards and Bluetooth standards.

14. A method for saving power in an ad-hoc network including a first station and a second station, wherein each of the first station and the second station has a corresponding network interface configured to wirelessly communicate with other stations in the ad-hoc network, the method comprising:
receiving, at the first station, an advertisement of a capability of the second station to buffer data traffic intended for other stations in the ad-hoc network;
responsive to receiving the advertisement of the capability of the second station to buffer data traffic intended for other stations in the ad-hoc network,
transmitting, from the first station, a first request to buffer data traffic intended for the first station for a first time period; and
responsive to transmitting the first request at the first station,
receiving, at the first station, a response to the first request, wherein the response acknowledges acceptance of the first request,
causing the first station to enter a power save mode, and
subsequent to buffering the data traffic intended for the first station, receiving, at the first station, the buffered data traffic intended for the first station after exiting the power save mode.

15. The method of claim 14, wherein the first time period corresponds to a length of time period during which the first station will enter the power save mode.

16. The method of claim 14, wherein:
the response to the first request indicates a second time period, the second time period corresponding to length of time during which the second station will buffer data traffic for the first station, and
causing the first station to enter the power save mode includes causing the first station to enter the power save mode for the second time period.

17. The method of claim 14, further comprising:
receiving, at the first station, a second request to buffer data traffic intended for the second station within a third time period from when the first station transmits the first request; and
responsive to receiving the second request to buffer data traffic intended for the second station within the third time period from when the first station transmits the first request,
preventing the first station from entering the power save mode.

18. The method of claim 17, further comprising, responsive to receiving the second request to buffer data traffic intended for the second station within the third time period from when the first station transmits the first request:
computing, at the first station, a random back-off period; and
responsive to the back-off period elapsing,
transmitting, from the first station, a third request to buffer data traffic intended for the first station for a fourth time period.

19. The method of claim 14, wherein the ad-hoc network is a wireless network using a protocol selected from the group consisting of IEEE 802.11 standards and Bluetooth standards.

20. A first station for use in an ad-hoc network, the first station comprising:
a network interface, wherein the network interface is configured to:
receive, from a second station, an advertisement of a capability of the second station to buffer data traffic intended for other stations in the ad-hoc network,
responsive to receiving the advertisement of the capability of the second station to buffer data traffic intended for other stations in the ad-hoc network,
transmit a first request to the second station to buffer data traffic intended for the first station for a first time period,
responsive to transmitting the first request at the first station,
receive, from the second station, a response to the request, wherein the response acknowledges acceptance of the first request, and
cause the first station to enter a power save mode, and
subsequent to buffering the data traffic intended for the first station, receive the buffered data traffic intended for the first station after exiting the power save mode.

21. The first station of claim 20, wherein the first time period corresponds to a length of time during which the first station will enter the first power save mode.

22. The first station of claim 20, wherein:
the response to the first request indicates a second time period, the second time period corresponding to a length of time during which the second station will buffer data traffic for the first station, and
the network interface is configured to cause the first station to enter the first power save mode includes causing the first station to enter the power save mode for the second time period.

23. The first station of claim 20, wherein the network interface is configured to:
receive, at the first station, a second request to buffer data traffic intended for the second station within a third time period from when the first station transmits the first request; and
responsive to receiving the second request to buffer data traffic intended for the second station within the third time period from when the first station transmits the first request,
prevent the first station from entering the power save mode.

24. The first station of claim 20, wherein the network interface is further configured to, responsive to receiving the second request to buffer data traffic intended for the second station within the third time period from when the first station transmits the first request:
compute a random back-off period, and
responsive to the back-off period elapsing, transmit a third request to buffer data traffic intended for the first station for a fourth time period.

25. The first station of claim 20, wherein the ad-hoc network is a wireless network using protocol selected from the group consisting of IEEE 802.11 standards and Bluetooth standards.

* * * * *